United States Patent
Enko

(10) Patent No.: US 7,624,091 B2
(45) Date of Patent: Nov. 24, 2009

(54) DATA PREFETCH IN STORAGE DEVICE

(75) Inventor: Yutaka Enko, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 298 days.

(21) Appl. No.: 10/785,976

(22) Filed: Feb. 26, 2004

(65) Prior Publication Data

US 2005/0102290 A1 May 12, 2005

(30) Foreign Application Priority Data

Nov. 12, 2003 (JP) ............................. 2003-381903

(51) Int. Cl.
*G06F 7/00* (2006.01)
*G06F 17/30* (2006.01)

(52) U.S. Cl. .................. 707/1; 707/2; 707/204

(58) Field of Classification Search .............. 707/103, 707/103 X, 13, 1, 10; 709/212, 245, 12; 705/51; 713/2; 711/137, 213
See application file for complete search history.

(56) References Cited

U.S. PATENT DOCUMENTS

| | | | | |
|---|---|---|---|---|
| 5,261,065 | A * | 11/1993 | Urabe et al. ..................... | 707/1 |
| 5,983,324 | A * | 11/1999 | Ukai et al. ..................... | 711/137 |
| 6,374,269 | B1 | 4/2002 | Ishikawa et al. | |
| 6,449,698 | B1 * | 9/2002 | Deshpande et al. ......... | 711/137 |
| 6,574,629 | B1 * | 6/2003 | Cooke, Jr. et al. ............ | 707/10 |
| 6,678,795 | B1 * | 1/2004 | Moreno et al. ............... | 711/137 |
| 6,684,319 | B1 * | 1/2004 | Mohamed et al. ............. | 712/24 |
| 6,732,117 | B1 * | 5/2004 | Chilton .................. | 707/103 X |
| 7,228,387 | B2 * | 6/2007 | Cai et al. ..................... | 711/137 |
| 2002/0078239 | A1 * | 6/2002 | Howard et al. ............... | 709/245 |
| 2002/0083120 | A1 | 6/2002 | Soltis | |
| 2003/0135729 | A1 * | 7/2003 | Mason et al. .................. | 713/2 |
| 2004/0139167 | A1 | 7/2004 | Edsall et al. | |
| 2004/0225719 | A1 * | 11/2004 | Kisley et al. ................. | 709/212 |
| 2004/0268050 | A1 * | 12/2004 | Cai et al. ..................... | 711/137 |
| 2005/0165686 | A1 * | 7/2005 | Zack et al. ..................... | 705/51 |

FOREIGN PATENT DOCUMENTS

| | | |
|---|---|---|
| EP | 1345113 | 9/2003 |
| JP | 07-028677 | 1/1995 |
| JP | 7-073085 | 3/1995 |
| JP | 07-073085 | 3/1995 |
| JP | 09-114712 | 5/1997 |
| JP | 11-212728 | 8/1999 |
| JP | 2000-148652 | 5/2000 |
| JP | 2002-023960 | 1/2002 |
| JP | 2002-108673 | 4/2002 |

* cited by examiner

*Primary Examiner*—Jean B. Fleurantin
*Assistant Examiner*—Giovanna Colan
(74) *Attorney, Agent, or Firm*—Mattingly & Malur, P.C.

(57) ABSTRACT

A meta data server 100, a user node 200 and a storage device 300 are connected together via a Fibre channel 10 and a LAN 20 to configure a NAS over SAN system. The user node 200 sends out a request to access the data in each file. The file is stored in the storage device 300 in blocks of default size. The meta data server 100 informs the user node 200 of the block number where the file to be accessed is stored based on meta data in which relationship between a file and a block is recorded. Prior to this processing, the meta data server 100 instructs the storage device 300 to cache the data in advance. This application enables the storage device 300 to provide the data promptly in response to read request from the user node 200.

4 Claims, 7 Drawing Sheets

Fig.2

| Path Name | File Length | Attribute | Block Number |
|---|---|---|---|
| /data/001.dat | 12000B | -rwxrwxrwx | 0x0000 1000 0001 0000<br>0x0000 1000 0001 0001<br>0x0000 1000 0001 0002 |
| /data/002.dat | 3840B | -rwx------ | 0x0000 1000 0002 0000 |
| /data/0032.dat | 5120B | -rwx------ | 0x0000 1000 0003 0000<br>0x0000 1000 0003 0001 |

DATA PREFETCH IN STORAGE DEVICE

BACKGROUND OF THE INVENTION

1. Field of the Invention

The present invention relates to control of reading data from a storage device that stores the data separately in blocks.

2. Description of the Related Art

NAS over SAN is known as one form of systems in which a storage device connected with a network is shared among multiple host computers. NAS over SAN is a technique of storing and reading a file in and from the storage device shared by respective host computers by means of NAS (Network Attached Storage) under SAN (Storage Area Network) environment.

In NAS over SAN, each of the files used by the host computers is stored in blocks defined in the storage device. Relationship between a file and one or plural blocks is managed as meta data. A meta data server for managing the meta data is connected with the network. The storage device, the host computer and the meta data server are connected via relatively cheap communication line, such as Ethernet™. The storage device and the host computer are connected via communication lines, such as Fibre channel that ensures high-speed communication.

The data which has been stored in the storage device is read out in the following sequence. The host computer first specifies the file to be read out and queries the block where the data is stored (Hereinafter referred to as "location"). The meta data server returns the location based on the meta data. Those communications are performed via Ethernet. Then, the host computer requests the storage device to read the data based on the returned location. The storage device provides the host computer with the data stored in the specified block via Fibre channel.

JP2002-108673A and JP1995-73085A disclose examples of system in which a meta data server and a storage device are configured separately. JP2002-23960A discloses an example of the system in which a meta data server is incorporated in a storage device.

In NAS over SAN, improved speed of reading the data from the storage device is required. The storage device is provided with a function of caching the data which has once been read out, however, further improvement is required. Those problems are in common in a system in which the data is read out in files from a storage device that stores the data separately in blocks.

SUMMARY OF THE INVENTION

An object of the present invention is thus to improve the reading speed of the data in such a system. The present invention is directed to a data storage system, such as NAS over SAN, in which a storage device, a host computer and a meta data server are connected together. The storage device stores the data therein in blocks and functions to cache part of the data. The host computer, which is used by the user, reads the data in files from the storage device. The meta data server manages meta data in which relationship between a file and one or plural blocks are recorded. The meta data may be stored in the meta data server or the storage device. The meta data server may be configured separately from the storage device and the host computer or may be incorporated in either of them.

The storage device, the host computer and the meta data server are connected together via a meta data communication line for transmitting the meta data. The storage device and the host computer are further connected together via a data communication line for transferring the data. In the present invention, Ethernet™ may be applied as the meta data communication lines and Fibre channel may be applied as the data communication lines. When the meta data is stored in the storage device, the meta data server and the storage device also are preferably connected together via the meta data communication lines in order to allow the meta data server to read the stored data promptly.

According to the present invention, when reading the data, the host computer inquires the meta data server about the meta data with specification of the file to be read. The meta data server returns the meta data to the host computer in response to this inquiry. The meta data server further instructs the storage device to cache the data stored in the block defined by the meta data. The storage device reads and caches the data which has been instructed by the meta data server (Hereinafter this processing is referred to as "prefetch" that means pre-reading). When the host computer requests the storage device to read the data based on the meta data, the storage device transmits the data corresponding to the read request.

A method of reading the data of the present invention can reduce required time for providing the host computer with the data by performing prefetching in the storage device.

In the present invention, since a cache area in the storage device is limited, whether or not the cache is needed may be determined based on a predetermined rule. This application ensures effective utilization of the cache area and a certain level of reading speed of the data to which high-speed reading is required. The rule for determining as to whether or not the cache is needed may be set depending on at least one of the file to be read, the user retrieving the data and the host computer. This application enables cache control responding to, for example, reading request of a specific file or reading request from a specific user or a host computer.

In view of enhancing convenience of the system, these rules may preferably be changed by authorized user. The change may be achieved, for example, by replacing or reconstructing a circuit that determines whether the cache is needed or not. Alternatively, a rule table arranged to define as to whether or not the cache is needed and is able to be changed by the user may be provided, so that particular module can determine as to whether or not the cache is needed by reference to this rule table. In the latter embodiment, there is an advantage of easy changing cache status by selectively use or edit of the rule table.

In the present invention, the caching or prefetching may be instructed in various timings, however, it is preferably instructed before the meta data server returns the meta data to the host computer. This application assures completion of prefetching well before the host computer requests the storage device to read out the data.

In the invention, all of the above features need not be provided, and thus it is possible to configure without a part of the features or in an appropriate combination of them. Furthermore, the invention is not limited to the method of reading the data described above and is possible to be configured in a variety of aspects. For example, this invention can be constructed as a meta data server and a storage device which are employed in the above system. The technique of the present invention is also attained by the computer program or the recording medium in which such a computer program is recorded in those devices. Typical examples of the recording medium include flexible disks, CD-ROMs, DVDs, magneto-optic discs, IC cards, ROM cartridges, punched cards, prints with barcodes or other codes printed thereon, internal storage devices (memories like a RAM and a ROM) and external storage devices of the computer, and a variety of other computer readable media.

BRIEF DESCRIPTION OF THE DRAWINGS

FIG. 2 is an exemplary diagram illustrating contents of the meta data.

DESCRIPTION OF THE PREFERRED EMBODIMENTS

Figure 1:
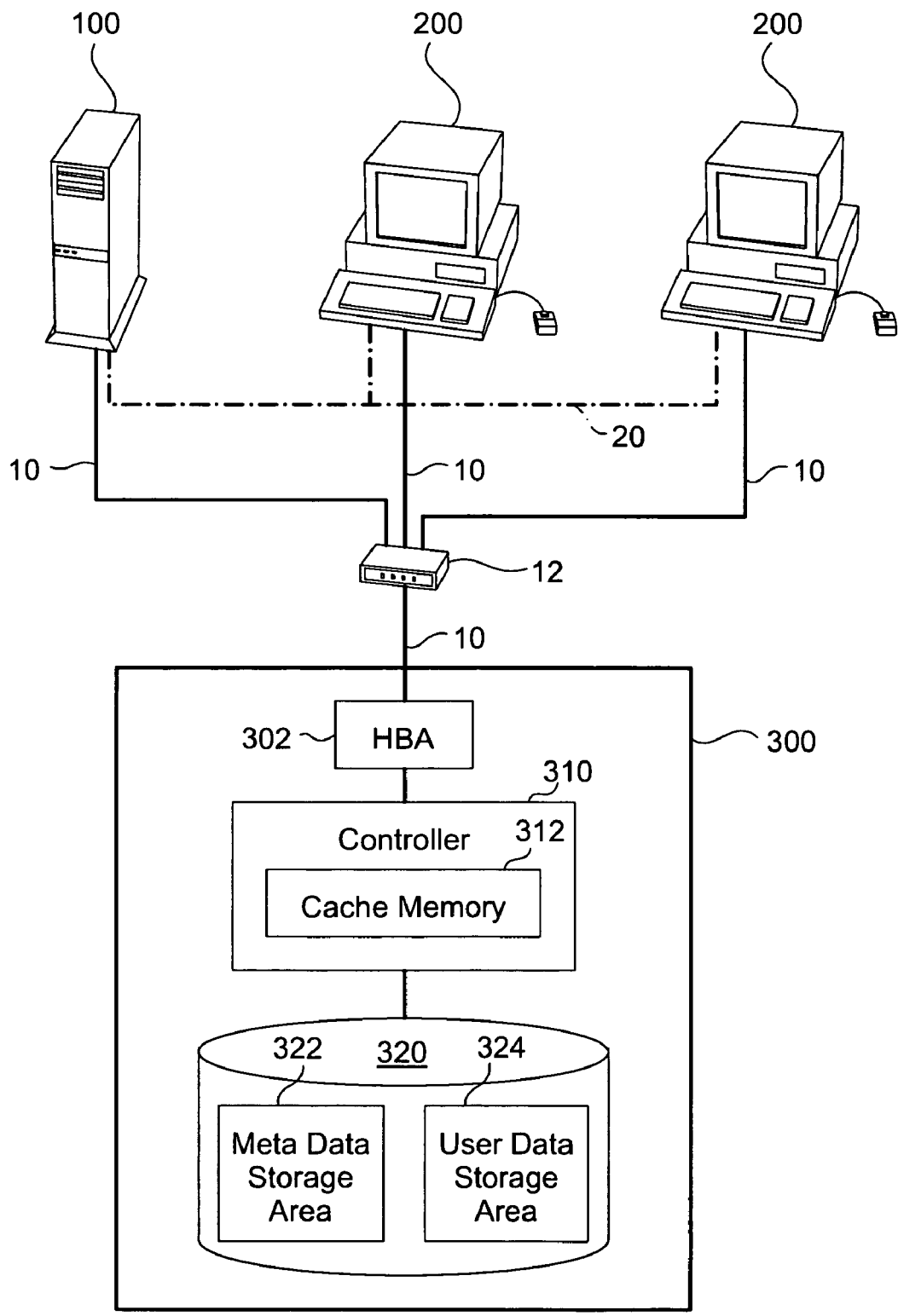
FIG. 1 illustrates the structure of a data storage system in accordance with an embodiment.

Some modes of carrying out the invention are discussed below as embodiments in the following order:
A. Structure of System
B. Data Reading Processing
C. Modifications
C1. First Modification
C2. Second Modification A. Structure of System FIG. 1 illustrates the structure of a data storage system in accordance with an embodiment. This system attains store and read of data under NAS over SAN in which a meta data server 100, user nodes 200 and a storage device 300 are mutually connected through a Fibre Cannel 10 via a Fibre Channel switch 12. The meta data server 100 and the user nodes 200 are also connected through a LAN (Local Area Network) 20 employing Ethernet™.

The number of the user nodes 200, which are operated by the user, is not limited two as shown but may be one or three and more. The storage device 300 stores document files and other types of files therein, which are created by the user, in blocks of default size preset unrelated to the file. When the user node 200 accesses to the storage device 300 to write or read the file, the meta data server 100 provides the user node 200 with a block number associated with the file. When accessing the file, the user node 200 instructs the storage device 300 to read and write the data with specification of the block number after query to the meta data server 100 about the block number.

The internal structure of the storage device 300 is also shown in FIG. 1. The storage device 300 includes a disk device 320 for storing the data therein in blocks. Meta data storage area 322 and user data storage area 324 are included in the disk device 320. The user data storage area 324 is arranged to store document files and other types of files created by the user of the user node 200. The meta data storage area 322 is arranged to store meta data for managing the block number indicating the data of which file is stored in. Contents of meta data are described later.

Operations of the storage device 300 are controlled by means of a controller 310 in which a CPU and a memory are connected together via a bus. The controller 310 includes a cache memory 312 used for reading and writing the data from and on the disk device 320. The storage device 300 is connected to the Fibre Channel 10 via a HBA (Host Bus Adaptor) 302 and the controller 310 communicates with other devices via the HBA 302.

FIG. 2 is an exemplary diagram illustrating contents of the meta data. The user node 200 writes and reads the data in files and the disk device 320 stores the data in blocks of default size preset unrelated to the file. The meta data is a table in which relationship between the file and the blocks is recorded.

As shown in FIG. 2, file length, attribute and the block number corresponding to each of files assigned by a path name are included in the meta data of this embodiment. Regardless of the above exemplified form of the meta data, more information may be included therein. The file length represents the size of each file. The attribute is access right to each file, in other words, permission. In the field of attribute, "r", "w" and "x" represent "read authority", "write authority" and "execution authority", respectively. In addition, first to third digits from the left represent owner authority, forth to sixth represent user group authority and seventh to ninth represent authority for other users.

The block number identifies the block in which the data of each file is stored. For example, the data of the file "001.dat" is stored in over three blocks, "0x0000 1000 0001 0000", "0x0000 1000 0001 0001" and "0x0000 1000 0001 0002". The contents of the meta data is changed every time the data is written on the disk device 320 or the attribute etc. is changed.

The meta data, which is used only by the meta data server 100, may be stored in the meta data server 100.

Figure 3:
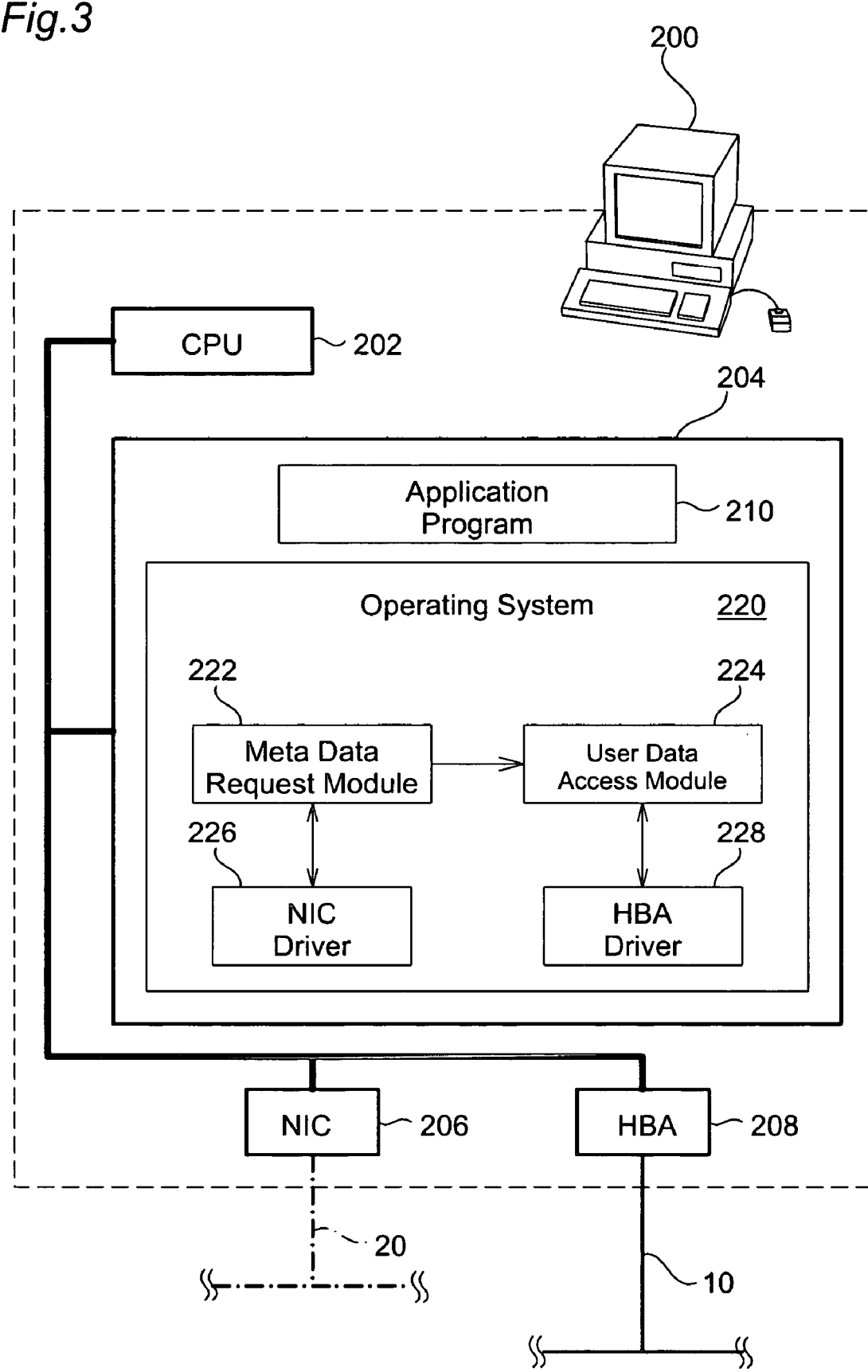
FIG. 3 is a schematic that shows the internal structure of the user node 200.

FIG. 3 is a schematic that shows the internal structure of the user node 200. The user node 200 may be a general-purpose personal computer that incorporates a CPU 202, a RAM, a ROM and a memory 204 like a hard disk. In this embodiment, the user node 200 has a HBA 208 for connecting with the Fibre channel 10 and a NIC (Network Interface Card) 206 for connecting with the LAN 20, and communicates with external devices through these interfaces.

The user node 200 achieves a diversity of functions by executing programs stored in the memory 204. An operating system 220 and an application program 210 running thereon are included as such program. During operating time, the application program 210 accesses to different files, in other words, writes and reads the file on and from the storage device 300.

FIG. 3 illustrates modules used by the operating system 220 in accessing to the file. A HBA driver 228 and a NIC driver 226 respectively control operations of the HBA 208 and the NIC 206. A meta data request module 222 specifies the name of the file to be accessed and requests the meta data server 100 to inform the corresponding block number. This communication is performed via the LAN 20. The meta data request module 222 provides an user data access module 224 with the provided block number. The user data access module 224 specifies the block number and reads and writes the data from and on the storage device 300. This communication is performed via the Fibre channel 10.

In this embodiment, both the meta data request module 222 and the user data access module 224 are actualized by software, but they may be implemented by hardware, for example, with ASIC.

Figure 4:
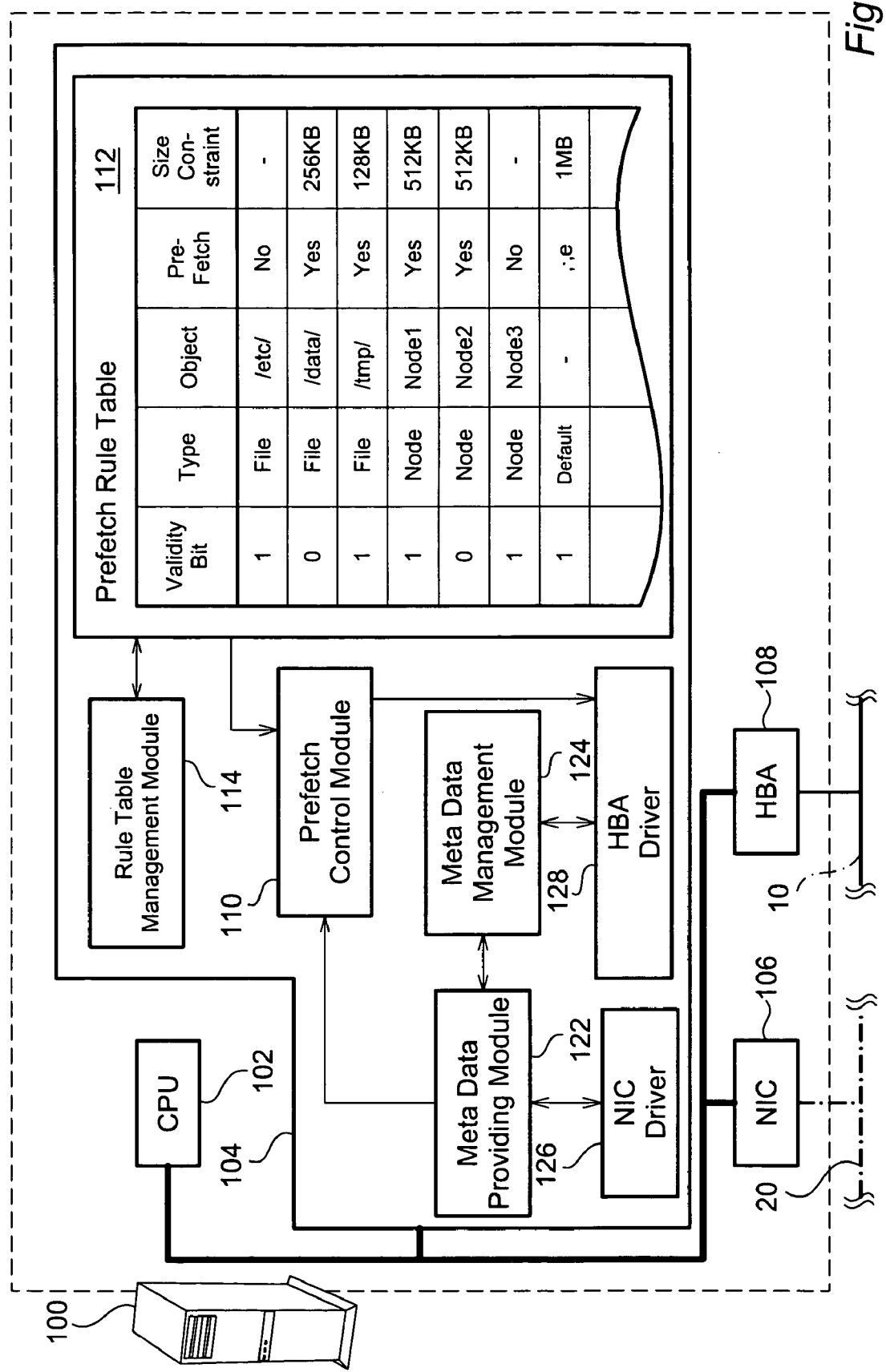
FIG. 4 is a schematic that shows the internal structure of the meta data server 100.

FIG. 4 is a schematic that shows the internal structure of the meta data server 100. The meta data server 100 may be a general-purpose personal computer that includes a CPU 102, a RAM, a ROM and a memory 104 like a hard disk. In this embodiment, the meta data server 100 has a HBA 108 for connecting with the Fibre channel 10 and a NIC (Network Interface Card) 106 for connecting with the LAN 20, and communicates with external devices through these interfaces, respectively.

FIG. 4 illustrates modules respectively prepared as the programs which are executed by the CPU 102 in accessing to the file. The HBA driver 128 and the NIC driver 126 control operations of the HBA 108 and the NIC 106, respectively. A meta data providing module 122 refers the meta data and provides the user node 200 with the block number corresponding to the file name specified by the user node 200. This communication is performed via the LAN 20.

In accordance with this embodiment, the meta data is stored in blocks of default size in the storage device 300. A meta data management module 124 retrieves the meta data from the storage device 300 in response to the request from the meta data providing module 122. This communication is performed via the Fibre channel 10. The meta data providing module 122 searches for the retrieved meta data, and thus acquires the block number corresponding to the name of the file that has been specified.

A prefetch control module 110 instructs the storage device 300 to perform prefetching of the data specified by the user node 200, in other words, to read the data from the disk device 320 and store it in a cache memory 312. In this embodiment, whether or not prefetching is needed may be changed based on condition for effective utilization of the cache memory 312. This condition is defined in a prefetch rule table 112. The meta data provider 122 provides the prefetch control module 110 with information required for judgment as to whether or not complying with the condition defined in this prefetch rule table 112.

One example of the prefetch rule table 112 is shown in FIG. 4. A validity bit represents validity of each condition; "1" indicates valid and "0" indicates invalid. Type indicates as to which is objected for setting each condition, the file or the user node. The condition set for the "file" type includes file name or directory name as an object. The condition set for the "user node" type includes user node name, user node address or user ID using the user node as an object. The prefetch rule table 112 stores whether or not prefetching is needed for each of those objects which have thus been set and further stores size constraint when prefetching is preformed.

The prefetch rule table 112 of this embodiment may optionally be set and changed by operating the meta data server 100 by the administrator of the data storage system. The rule table management module 114 provides an interface window for setting and changing the prefetch rule table 112, authenticates administrator right and performs processing according to the command input by the administrator. The prefetch rule table 112 may be changed by operating the meta data server 100 and may also be changed by remote-control from the user node 200.

B. Data Reading Processing

Figure 5:
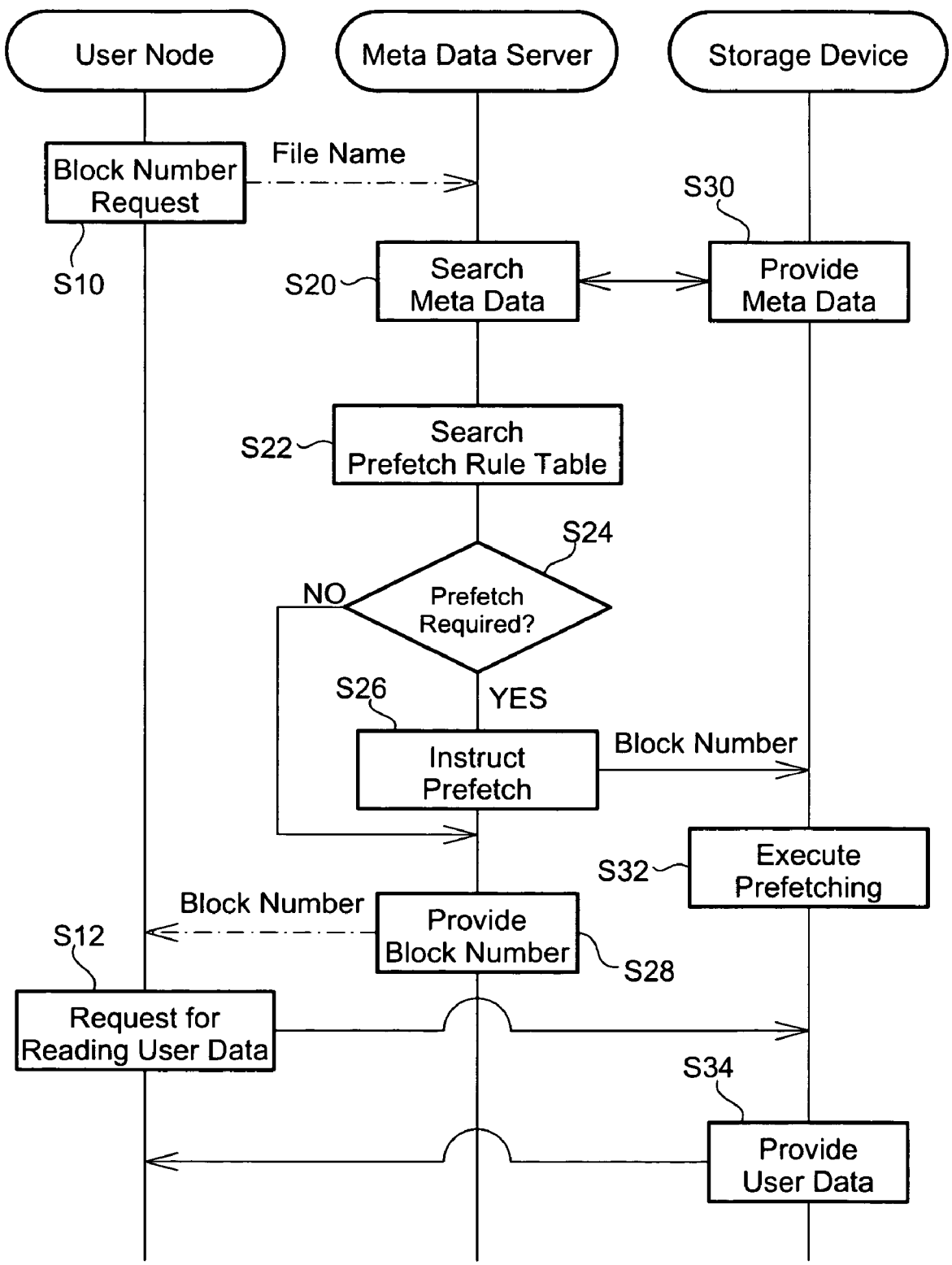
FIG. 5 is a flowchart of processing of reading the data.

FIG. 5 is a flowchart illustrating data reading processing, which shows processing in the user node 200 on the left side, in the meta data server 100 on the center and in the storage device 300 on the right side. The communications between the devices shown in full lines are performed via the Fibre channel 10 and those in dashed lines are performed via the LAN 20.

When a reading request of the file is submitted in the course of application program process in the user node 200, the user node 200 transmits a query request about the block number to the meta data server 100 via the LAN 20 (Step S10). At this time, the meta data server 100 is informed of the name of the file to be read out. Specification of offset and data length may also be included in this information. The offset is the information for specifying relative position of the data to be read out on the basis of the head of the file. The data length represents the size of the data to be read out. Specifying the offset enables the file to be read out in the midstream, for example. In addition, specifying the data length enables read of only portion of the file.

The meta data server 100 searches the meta data in response to the request from the user node 200 (Step S20). To execute the search, the meta data server 100 specifies the given block number in which the meta data is stored and outputs the reading request of the data to the storage device 300. In response to this request, the storage device 300 provides the meta data via the Fibre channel 10 (Step S30), so that the meta data can be searched.

The meta data server 100 then searches the prefetch rule table 112 for the condition in which the validity bit "1" is included (Step S22) to determine whether or not prefetching is needed (Step S24). If the condition with which the specified file or the user node 200 that transmitted the query request about the block number is complied is found in the prefetch rule table 112, whether or not prefetching is needed is determined according to the setting therein. Otherwise, it is determined according to default setting.

When it is determined that prefetching is needed (Step S24), the meta data server 100 instructs the storage device 300 to perform prefetching with specification of the block number (Step S26). This communication is performed via the Fibre channel 10. The storage device 300 performs prefetching, in other words, reads the specified data from the disk device 320 and store it in the cache memory 312 (Step S32).

After completing the instruction of prefetching (Step S26), the meta data server 100 provides the user node 200 with the block number via the LAN 20 (Step S28). The user node 200 transmits the reading request of the user data to the storage device 300 via the Fibre channel 10 based on this block number (Step S12). Upon transmission of the user data from the storage device 300 in response to this request (Step S34), reading processing of the file is completed. Prefetching the data required by the user in the cache memory 312 achieves the storage device 300 to provide the data promptly.

Although the prefetch instruction is submitted to the storage device 300 prior to the notification of the block number to the user node 200 in this embodiment, the order of these processing may be reverse. However, performing prefetching prior to the notification of the block number advantageously may complete prefetching more definitely before receiving the reading request from the user node 200 and thus ensures the reading speed of the data.

Although prefetching condition, whether or not prefetching is needed, is changed according to the prefetch rule table 112 in this embodiment, it is applicable to skip steps S22 and S24 and perform prefetching unconditionally. However, changing the prefetching condition advantageously utilizes the amount of the cache memory 312 for the data requiring high reading speed effectively and thus ensures the reading speed at a certain level.

C. Modifications

C1. First Modification

Figure 6:
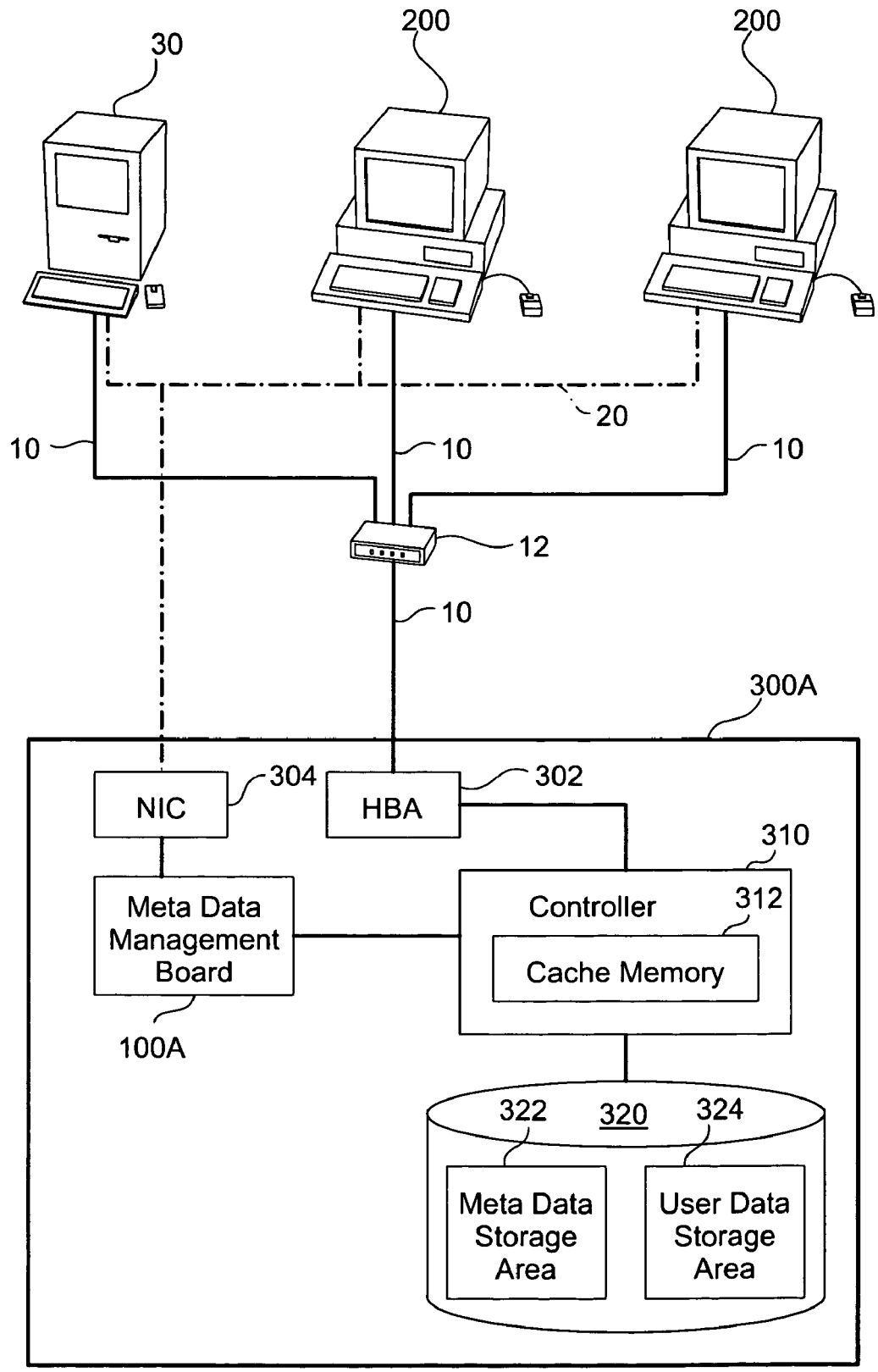
FIG. 6 illustrates the structure of a data storage system as a modification.

FIG. 6 illustrates the structure of a data storage system as a modification. In a modified system, a meta data management board 100A is incorporated in a storage device 300A. The internal structure of the meta data management board 100A is identical to that of the meta data server 100 (FIG. 4) in the embodiment. The storage device 300A also includes a NIC 304 to enable the meta data management board 100A to communicate through the LAN 20.

In this modification, a terminal 30 for the administrator is connected with the network. The terminal 30 may be configured by including a NIC, a HBA or the like in a general-purpose personal computer, for example. The administrator may operate this terminal 30 to access to the meta data management board 100A, and thus sets and changes a prefetch rule table by remote-control. Well-known art may be applied for the method of achieving such operation by remote-control and thereby not specifically described here.

In the modified system, reading processing of the data may be achieved by performing the processing of the meta data server 100 in the data reading processing as described in the embodiment (FIG. 5) by the meta data management board 100A. Performing this processing enables the similar effect as the embodiment, in other words, improvement of the reading speed due to prefetching and effective utilization of the cache memory 312 due to change of prefetching condition.

Figure 7:
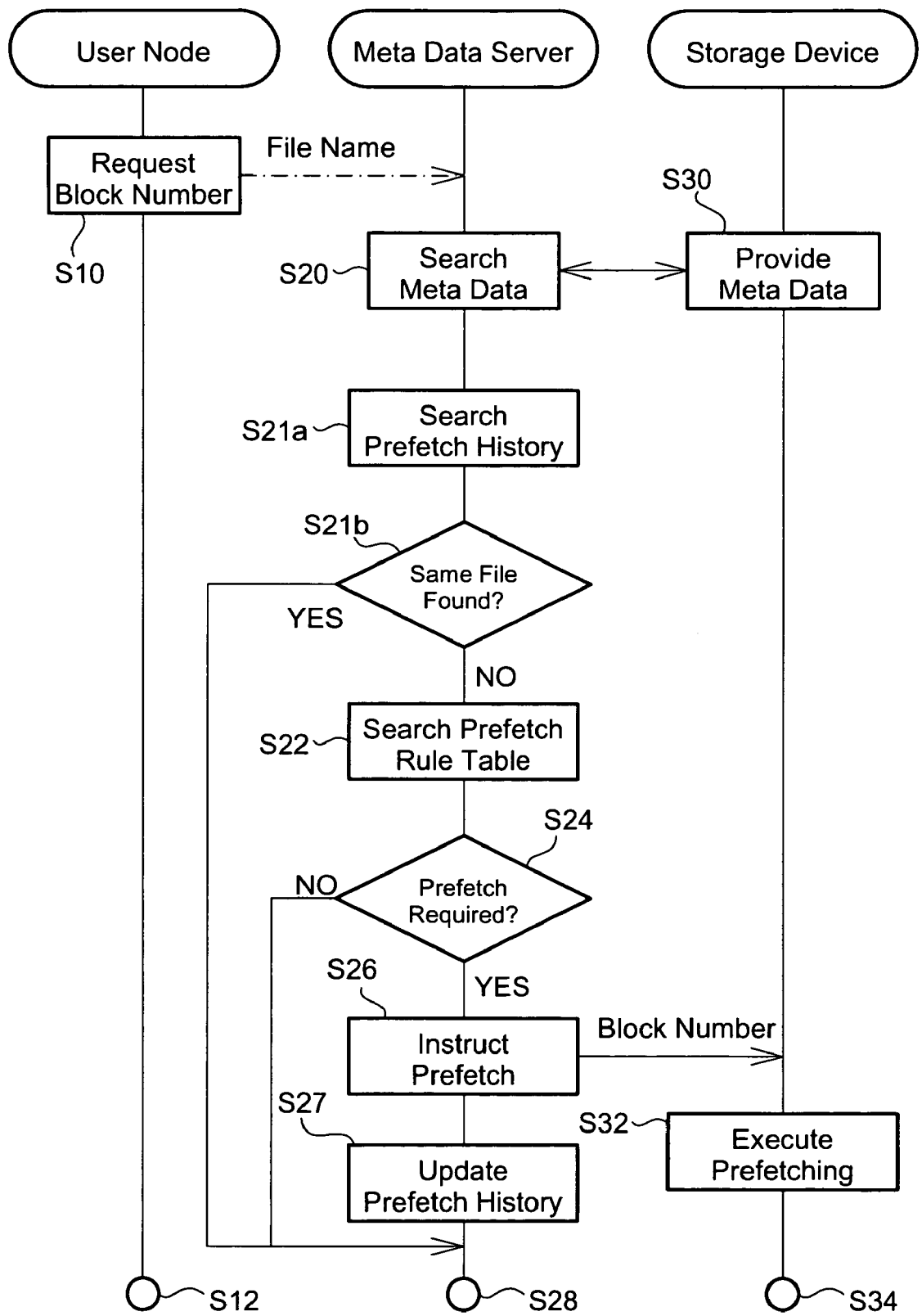
FIG. 7 is a flowchart of processing of reading the data as a modification.

C2. Second Modification:

FIG. 7 is a flowchart of reading processing of the data as a modification. For convenience of explanation, the structure of the embodiment (FIG. 1), which may also be applied to that of the modification, is used herein. In the processing of the modification, the meta data server 100 manages prefetch history and controls frequency of prefetch instruction to the storage device 300 by reference to this history.

When the user node 200 transmits a request of the block number to the meta data server 100 with specification of file name (Step S10), the meta data server 100 receives the meta data from the storage device 300 (Step S30) and searches the meta data (Step S20).

The meta data server 100 then searches the prefetch history for the file name as a key which has been requested by the user node 200 (Step S21a). If the file that is subject to query has been requested for its block number by any one of the user nodes 200 in the network, prefetching should have been completed in the storage device 300. The instruction of prefetching may be omitted for thus prefetched data. Accordingly, performing this search enables the meta data server 100 to determine if the instruction of prefetching is needed.

Since the data which is instructed to be prefetched is stored in the cache of the storage device 300 only in the meanwhile, all of the prefetched data does not exist in the cache at the present moment. The meta data server 100 therefore preferably omits the prefetch instruction only for the prefetched file whose elapsed time after prefetching is within predetermined period in order to ensure enhancement of the reading speed due to prefetching. The predetermined period may arbitrarily be set within the range where most of the cached data is guaranteed to be retained in the storage device 300.

The elapsed time after prefetching may be referred in various manners. For example, the time when prefetch instruction has been performed or the elapsed time after prefetching may be associated with the file name to be managed in the prefetch history. In the case of using the prefetch history in such format, the meta data server 100 can limit the scope of searches referring to the elapsed time from prefeching. The guarantee period for retaining the cached data generally changes with conditions, such as frequency of read of the data from the storage device 300. The above application advantageously enables the scope of searches to be changed in a flexible manner responding to such changes.

Alternatively, the meta data server 100 may periodically maintenance the prefetch history and delete the name of the file which has been retained for over the predetermined period from the prefetch historty. The above embodiment makes the predetermined period fixed but can control the amount of the data of the prefetch history, and thus saves the amount of the memory required for managing the prefetch history and the required time for the search.

When the result of the above search shows that the queried file name is not found in the prefetch history (Step S21b), it is to be determined that the corresponding data has not been cached. Accordingly, the meta data server 100 searches the prefetch rule table (Step S22), determines if prefetching is needed (Step S24) and outputs the prefetch instruction to the storage device 300 (Step S26). The storage device 300 performs prefetching in response to this instruction (Step S32). After instructing prefetching, the meta data server 100 updates the prefech history (Step S27). The following processing is similar to that in the embodiment (FIG. 5), and is not described here.

When the queried file name is found in the prefetch history, the meta data server 100 determines that prefetching is not needed and skips processing in steps S22-S27.

In accordance with the processing of the modification, when there are many accesses from one user node or some user nodes to one file, frequency of output of the prefetch instruction may be controlled. This application may decrease line load between the meta data server 100 and the storage device 300 and processing load of them.

Although various embodiments of the invention have been described, it should be noted that the invention is not limited to these embodiments and may include various configurations without departing from the spirit of the invention.

What is claimed is:

1. A method for reading data from a storage device in a data storage system including the storage device, a metadata server, and a plurality of host computers,
   wherein the storage device includes disk devices and a cache memory, stores data in the disk devices in blocks, and caches a part of the data in the cache memory,
   wherein each of the plurality of host computers manages the data stored in the storage device in files, and
   wherein the metadata server manages metadata indicating a relationship between the files and the blocks, and includes a prefetch rule table storing information indicating whether a prefetch operation should be operated for each of the plurality of host computers,
   the method for reading the data comprising the steps of:
   (a) issuing an inquiry about metadata of a certain file to be read out from a certain host computer to the metadata server;
   (b) replying to the inquiry from the metadata server to the certain host computer by sending metadata of the certain file to the certain host computer;
   (c) before sending metadata of the certain file to the certain host computer, determining, by the metadata server, whether the prefetch operation should be operated for the certain host computer issuing the inquiry, by using an ID of the certain host computer included in the inquiry and the prefetch rule table storing information indicating whether the prefetch operation should be operated for a host computer identified by the ID;
   (d) if the prefetch operation should be operated for the certain host computer, from the metadata server, instructing the storage device to cache data of the certain file in cache memory from the disk devices;
   (e) after caching data in the cache memory, issuing, from the certain host computer to the storage device, a read request for reading out the data of the certain file based on the metadata received from the metadata server; and (f) sending, from the storage device to the host computer, the data of the certain file cached in the cache memory in response to the read request.

2. A method for reading the data in accordance with claim 1, wherein the prefetch rule table is configured to be changeable by an authorized user.

3. A method for reading the data in accordance with claim 2, wherein the meta data server includes a rule reference module that determines whether or not caching the data is needed by reference to the rule table.

4. A method for reading the data in accordance with claim 1, wherein the meta data communication line is Ethernet and wherein the meta data communication line is Fibre channel.

* * * * *